C. I. DAILEY.
FEED BOX.
APPLICATION FILED JULY 22, 1918.
1,296,772.
Patented Mar. 11, 1919.
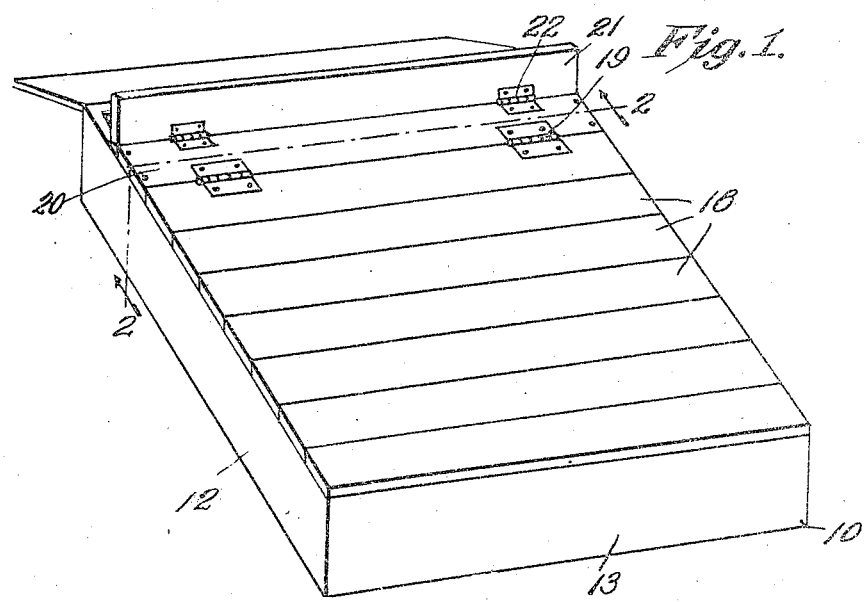
Fig. 1.
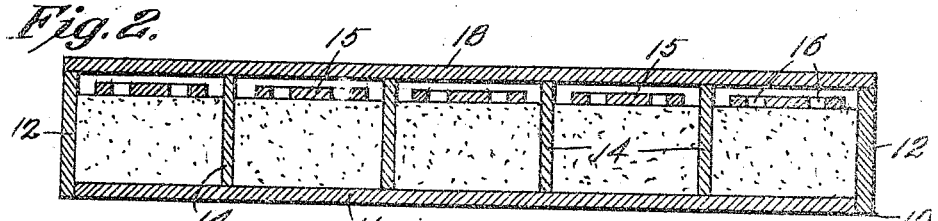
Fig. 2.
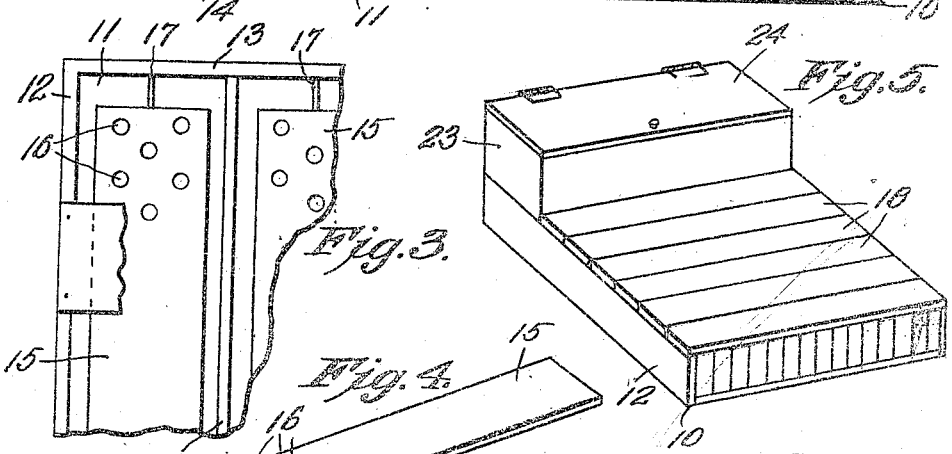
Fig. 3.
Fig. 4.
Fig. 5.
Witnesses
James F. Crown
H. B. Vrooman
Inventor
Clarence I. Dailey,
By
Richard Owen,
Attorney

UNITED STATES PATENT OFFICE.

CLARENCE I. DAILEY, OF JEFFERSONVILLE, INDIANA.

FEED-BOX.

1,296,772.

Specification of Letters Patent. Patented Mar. 11, 1919.

Application filed July 22, 1918. Serial No. 246,193.

*To all whom it may concern:*

Be it known that I, CLARENCE I. DAILEY, a citizen of the United States, residing at Jeffersonville, in the county of Clark and State of Indiana, have invented certain new and useful Improvements in Feed-Boxes, of which the following is a specification.

This invention is a feed box and has special reference to a feed box for poultry.

One object of this invention is the production of a feed box which is so constructed as to allow of its continual use for a time, and under such conditions providing a proper quantity of feed for the poultry, without underfeeding or overfeeding the same.

Another object of this invention is the production of a feed box for poultry, wherein the device is so constructed as to prevent the clogging of the feed, and also allowing of free access to proper quantities of the feed at different intervals.

Another object of this invention is the production of a poultry feed box which includes a plurality of feed plates so arranged as to permit of access to the troughs of the box and to move the food into position for proper access thereto.

A still further object of this invention is the production of a feed box wherein a movable sectional cover is provided thus permitting portions of the cover to be removed at different intervals for allowing access to the different troughs of the feed box at a desired time.

One practical form of construction and assembly of the present invention will be hereinafter described and is illustrated in the accompanying drawing, in which—

Figure 1 is a detail perspective view of the feed box, the sectional cover thereof being shown in a closed position.

Fig. 2 is a section taken on the line 2—2 of Fig. 1.

Fig. 3 is a fragmentary top plan view of a portion of the device illustrating the manner in which the feed plates are carried in the trough.

Fig. 4 is a detail perspective view of one of the feed plates, and

Fig. 5 is a detail perspective view of the feed box illustrating how a hopper may be positioned upon one end thereof for allowing an increased quantity of feed to be provided for the several troughs.

In the preferred embodiment of the present invention, about to be described, it will be seen that the feed box is indicated in general at 10 and comprises a base 11 having side walls 12 and end walls 13 which are secured thereto to form preferably a rectangular box. It is of course obvious that any other shaped box or size may be employed without departing from the spirit of the present invention.

Partitions 14 are carried within the box 10 and extend longitudinally thereof as shown in Figs. 2 and 3. It will be noted that these partitions are carried in parallel spaced relation, and for this reason form separate troughs within the box. It is therefore obvious that different kinds of food may be carried in the different troughs according to the desires of the user of the structure.

Each trough is provided with a feed plate 15, which is shown in detail in Fig. 4. The feed plate 15 is elongated and is provided with openings 16 formed therein. A stem 17 is also carried by one end of the plate 15. When the plate is in use, it is carried within one of the troughs, as shown in Figs. 2 and 3 and it will be noted that these feed plates are not as broad or as long as the trough and for this reason access is permitted around the side edges and ends of the plates as well as through the openings 16. Although as herein illustrated openings are provided adjacent only the ends of the plate, it is obvious that openings may be provided throughout the entire length of the feed plates without departing from the spirit of the present invention.

It will be noted that when the plates are carried within the troughs, the stems 17 will bear against one of the end walls and thus hold the ends of the plates spaced from the ends of the troughs.

In order to close the top of the box, 10, there is provided a cover consisting of a plurality of sections 18. These sections may be connected together, or may be placed upon the box independent of connection, although engaging each other at their side edges. In the event the same are hinged together, they must also be connected by other hinges 19 to a strip 20, which may be fixed or may be removably carried upon the side walls 12.

If so desired, a further strip 21 may be connected by hinges 22 to the strip 20, whereby a closure is formed the entire length of the box. When this device is in operation, the cover consisting of several sections may be removed, as well as the feed plates 15. Feed may then be poured into the several troughs adjacent the inner ends of the trough and at this time the inner ends of the trough are filled up to their top portions. Feed may then be poured into the trough to diminish in depth toward the opposite end of the troughs. The plates 15 may then be placed in the troughs to have the ends provided with stems adjacent the ends of the troughs where the shallow food is carried. The cover consisting of several sections may then be placed upon the body in the manner hereinbefore specified. This device may be used wherever it is necessary to feed poultry and at the first interval the forward strip 18 may be folded or removed from a closed position and thus allow access to the forward portions of the trough. The poultry will then have access to the food through the openings 16 and around the side edges and the end of each plate provided with stems 17.

As only a portion of the forward ends of the troughs are exposed, it is obvious the food will be entirely removed and then the next section 18 of the cover may be removed or folded to an out of the way position. Therefore, the poultry will have further access to the trough. Accordingly, the feed plates will at this time extend downwardly toward their forward ends, and it is obvious these plates will tend to evenly distribute the food toward their forward ends and around the side edges thereof for allowing of free access to the food. The removal of the strips which form the cover, may continue until the cover has been entirely removed and then after the contents of the several troughs has been removed, the box may be re-filled in the manner hereinbefore described.

By referring to Fig. 5, it is obvious that if so desired a hopper 23 may be placed upon the box adjacent its rear end. This hopper 23 may be of a rectangular construction or any other desired shape and have a cover 24, whereby the hopper may be filled to the upper portion thereof and the cover then moved to a closed position. It is obvious that when the hopper is used, food for the troughs may be placed therein and the device used much longer than when the food is carried only within the troughs. The operation of the device as illustrated in Fig. 5 is in all respects similar to the device as operated in connection with the structure shown in Fig. 1, the only difference being, that by the provision of the hopper, a larger quantity of food may be placed therein and the device used much longer before necessitating the refilling of the structure.

From the foregoing description, it will be seen that a comparatively light food box has been provided for poultry, which is so simple in construction as to prevent clogging of the food positioned therein. Also, it may be used for a considerable time, as the feeding operation is automatic, all that is necessary being the removal of the various sections of the cover from time to time. The feed plates will evenly distribute the food within the troughs and will allow free access to the feed, although preventing the overfeeding or underfeeding of the poultry, when the device is in use.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent, is:—

In a device of the class described, the combination of a box, an apertured feed plate positioned within said box, the side edges and one end of said feed plate being spaced from the walls of the box, a pin carried by one end of said feed plate and engaging one wall of said box, thus holding the plate against shifting into engagement with the inner surface of the box and a removable cover extending transversely of said box, thus allowing access to the interior of the box whereby the contents thereof may be removed through and around said plate causing the forward end of the plate to move downwardly and gradually feed the contents of the box toward the front end of the plate.

In testimony whereof I affix my signature in presence of two witnesses.

CLARENCE I. DAILEY.

Witnesses:
 HERMAN RAVE,
 CHARLES KNIGHT.